US011347538B2

(12) United States Patent
Lee et al.

(10) Patent No.: US 11,347,538 B2
(45) Date of Patent: May 31, 2022

(54) METHOD FOR CONTROLLING EXECUTION OF HETEROGENEOUS OPERATING SYSTEMS AND ELECTRONIC DEVICE AND STORAGE MEDIUM THEREFOR

(71) Applicant: Samsung Electronics Co., Ltd., Suwon-si (KR)

(72) Inventors: Hyungil Lee, Suwon-si (KR); Myungsu Cha, Suwon-si (KR); Kyungjoong Shin, Suwon-si (KR); Yong Shin, Suwon-si (KR); Kyungsun Lee, Suwon-si (KR); Chaewhan Lim, Suwon-si (KR); Kwangsik Choi, Suwon-si (KR); Junyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 16/576,137

(22) Filed: Sep. 19, 2019

(65) Prior Publication Data
US 2020/0117499 A1 Apr. 16, 2020

(30) Foreign Application Priority Data
Oct. 16, 2018 (KR) .................. 10-2018-0123408

(51) Int. Cl.
*G06Q 30/04* (2012.01)
*G06F 9/46* (2006.01)
*G06F 3/14* (2006.01)

(52) U.S. Cl.
CPC ............ *G06F 9/465* (2013.01); *G06F 3/1423* (2013.01)

(58) Field of Classification Search
CPC .............................. G06F 9/465; G06F 3/1423
See application file for complete search history.

(56) References Cited

U.S. PATENT DOCUMENTS

| 9,916,233 B1 | 3/2018 | Qureshi et al. |
| 2011/0016299 A1 | 1/2011 | Galicia et al. |

(Continued)

FOREIGN PATENT DOCUMENTS

| KR | 10-2012-0030563 A | 3/2012 |
| KR | 10-2012-0113160 A | 10/2012 |
| KR | 10-2014-0043167 A | 4/2014 |

OTHER PUBLICATIONS

Lei Xu et al. "Condroid: A Container-Based Virtualization Solution Adapted for Android Devices" (Year: 2015).*

(Continued)

*Primary Examiner* — Doon Y Chow
*Assistant Examiner* — Abdou K Seye
(74) *Attorney, Agent, or Firm* — Jefferson IP Law, LLP

(57) ABSTRACT

An electronic device is provided. The electronic device includes a display, at least one processor, and a memory operatively connected with the display and the at least one processor and configured to store a plurality of applications including a first application configured to execute using a first operating system (OS) and a second application configured to execute using a second OS, wherein the memory stores instructions configured to, when executed, cause the at least one processor to output a first object and a second object on a screen of the first OS, wherein the first object is associated with execution of the first application and the second object is associated with execution of the second application and, when the second object is selected, output an execution screen of the second application on the screen of the first OS. Other embodiments are also possible.

18 Claims, 16 Drawing Sheets

(56) References Cited

U.S. PATENT DOCUMENTS

| | | | |
|---|---|---|---|
| 2011/0016301 A1 | 1/2011 | Galicia et al. | |
| 2011/0093691 A1 | 4/2011 | Galicia et al. | |
| 2011/0126216 A1 | 5/2011 | Galicia et al. | |
| 2012/0081353 A1 | 4/2012 | Yusupov et al. | |
| 2012/0089992 A1* | 4/2012 | Reeves | G06F 3/1431 719/318 |
| 2014/0281897 A1* | 9/2014 | Goodger | G06F 9/455 715/234 |
| 2014/0351752 A1* | 11/2014 | Wu | G06F 16/74 715/810 |
| 2016/0375360 A1* | 12/2016 | Poisner | A63F 13/00 345/633 |
| 2016/0381058 A1* | 12/2016 | Antony | G06F 21/566 726/23 |
| 2017/0206090 A1* | 7/2017 | Kirkpatrick | H04L 41/02 |
| 2017/0358278 A1 | 12/2017 | Lee et al. | |
| 2018/0109625 A1 | 4/2018 | Jayaraman et al. | |
| 2018/0137308 A1 | 5/2018 | Jung et al. | |
| 2020/0233684 A1* | 7/2020 | Horne | G06F 21/53 |

OTHER PUBLICATIONS

Ranjith BalaKrishnan et al "Set Top Box System with Android Support using Embedded Linux Operating SystemPaper", (Year: 2012).*

International Search Report dated Jan. 23, 2020, issued in International Patent Application No. PCT/KR2019/013424.

European Search Report dated Aug. 18, 2021; European Appln No. 19872936.0-1224 / 3827333 PCT/KR2019013424.

* cited by examiner

METHOD FOR CONTROLLING EXECUTION OF HETEROGENEOUS OPERATING SYSTEMS AND ELECTRONIC DEVICE AND STORAGE MEDIUM THEREFOR

CROSS-REFERENCE TO RELATED APPLICATION(S)

This application is based on and claims priority under 35 U.S.C. § 119(a) of a Korean patent application number 10-2018-0123408, filed on Oct. 16, 2018, in the Korean Intellectual Property Office, the disclosure of which is incorporated by reference herein in its entirety.

BACKGROUND

1. Field

The disclosure relates to methods for controlling execution of heterogeneous operating systems and electronic devices and storage media for the same.

2. Description of Related Art

A speedup in processing performance of mobile electronic devices and technology has led to the advent of smartphones armed with various open operating systems and brand-new services. The enhanced performance of smartphones, comparable with that of personal computers, puts smartphones to more frequent use as compared with other electronic devices such as desktop a personal computer (PC), laptop computers, etc. More and more users prefer smartphones to desktop PCs for the purposes of saving and using files. Files stored in a smartphone sometimes need to be run or be modified on a desktop PC. With higher performance and connectability to desktop PCs or external monitors, smartphones might be able to replace home and business computers.

There are being developed various techniques for connecting smartphones to desktop PCs or external monitors to allow them to be used in a similar environment to that of the desktop PC.

Electronic devices typically operate based on a single operating system (OS) and, to run another operating system (OS), they require virtual network computing (VNC) or rebooting. VNC or other virtual machines may configure an environment to enable the same hardware device to use multiple OSs. For example, Android and Linux may be used by sharing the graphics processing unit (GPU) via a virtual machine.

However, rebooting is time-consuming and bothersome while use of a virtual machine may slow down the system. When another OS is running, the user may be forced to use applications which can only be run on the other OS but not on the main OS.

The above information is presented as background information only to assist with an understanding of the disclosure. No determination has been made, and no assertion is made, as to whether any of the above might be applicable as prior art with regard to the disclosure.

SUMMARY

Interworking between heterogeneous operating systems (OSs) in using or manipulating applications on the heterogeneous OSs might be able to expand usability of smartphones not only for their own functionality but also for other various purposes.

Aspects of the disclosure are to address at least the above-mentioned problems and/or disadvantages and to provide at least the advantages described below. Accordingly, an aspect of the disclosure is to provide an apparatus and method for an electronic device comprises a display, at least one processor, and a memory operatively connected with the display and the at least one processor and configured to store a plurality of applications including a first application operated based on a first OS and a second application operated based on a second OS, wherein the memory stores instructions executed to enable the at least one processor to output a first object associated with execution of the first application and a second object associated with execution of the second application on a screen of the first OS and, when the second object among the first object and the second object is selected, output an execution screen of the second application on at least part of the screen of the first OS.

Another aspect of the disclosure is to provide an apparatus and a method for controlling execution of heterogeneous OSs on an electronic device comprises outputting a first object associated with execution of a first application operated based on a first OS and a second object associated with execution of a second application operated based on a second OS on a screen of the first OS, receiving a selection of the second object among the first object and the second object, and corresponding to the selection of the second object, outputting an execution screen of the second application on at least part of the screen of the first OS.

Additional aspects will be set forth in part in the description which follows and, in part, will be apparent from the description, or may be learned by practice of the presented embodiments.

In accordance with an aspect of the disclosure, a storage medium storing commands configured to be executed by at least one processor to enable the at least one processor to perform at least one operation is provided. The storage medium includes outputting a first object associated with execution of a first application operated based on a first OS and a second object associated with execution of a second application operated based on a second OS on a screen of the first OS, receiving a selection of the second object among the first object and the second object, and corresponding to the selection of the second object, outputting an execution screen of the second application on at least part of the screen of the first OS.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
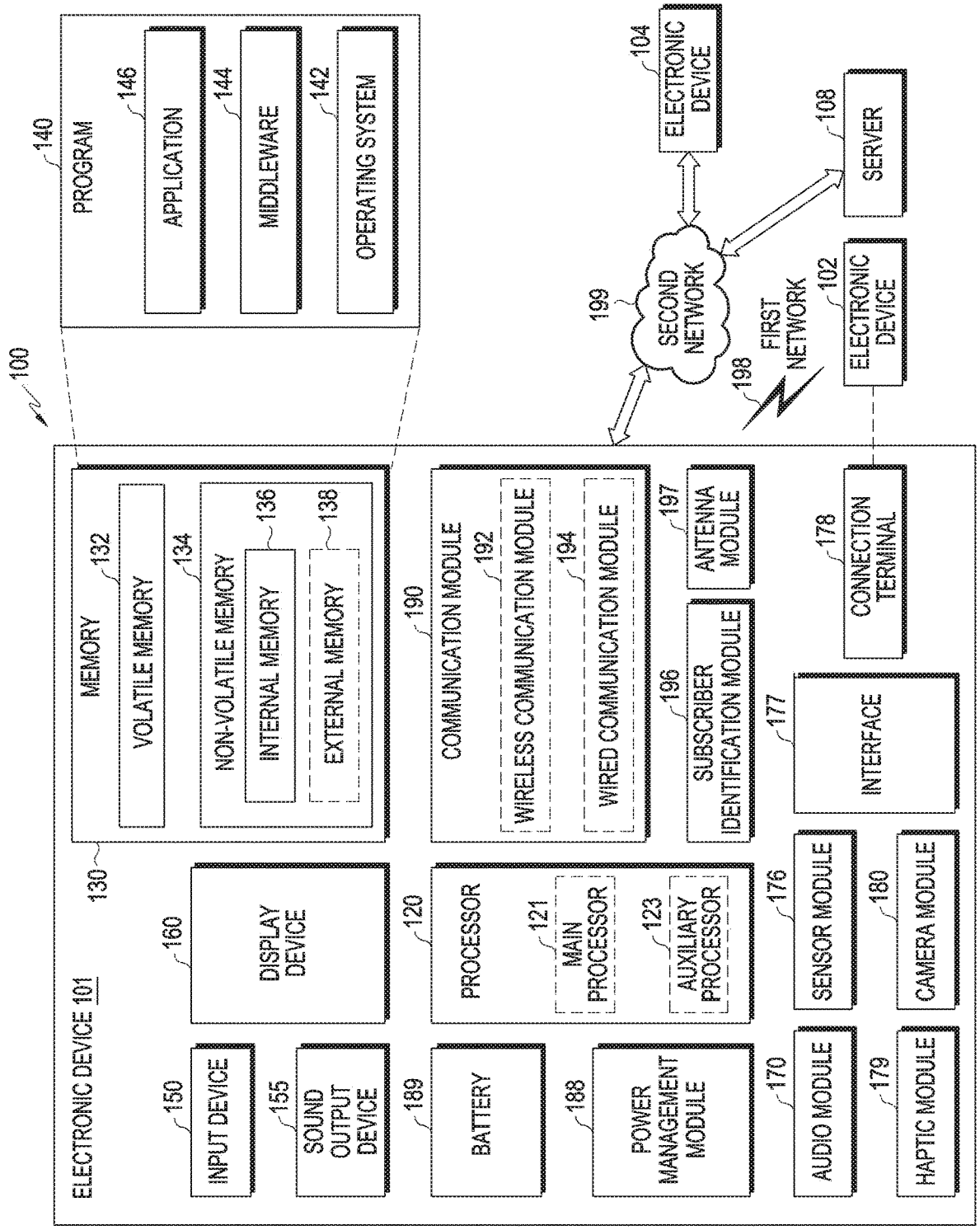
FIG. 1 is a block diagram illustrating an electronic device in a network environment according to an embodiment of the disclosure.

FIG. 1 is a block diagram illustrating an electronic device 101 in a network environment 100 according to an embodiment the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state, or along with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone)) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performance to the electronic device 101. The electronic device 101 may provide the outcome, with or without further processing of the outcome, as at least part of a reply to the request. To that end, a cloud computing, distributed computing, or client-server computing technology may be used, for example.

Figure 2:
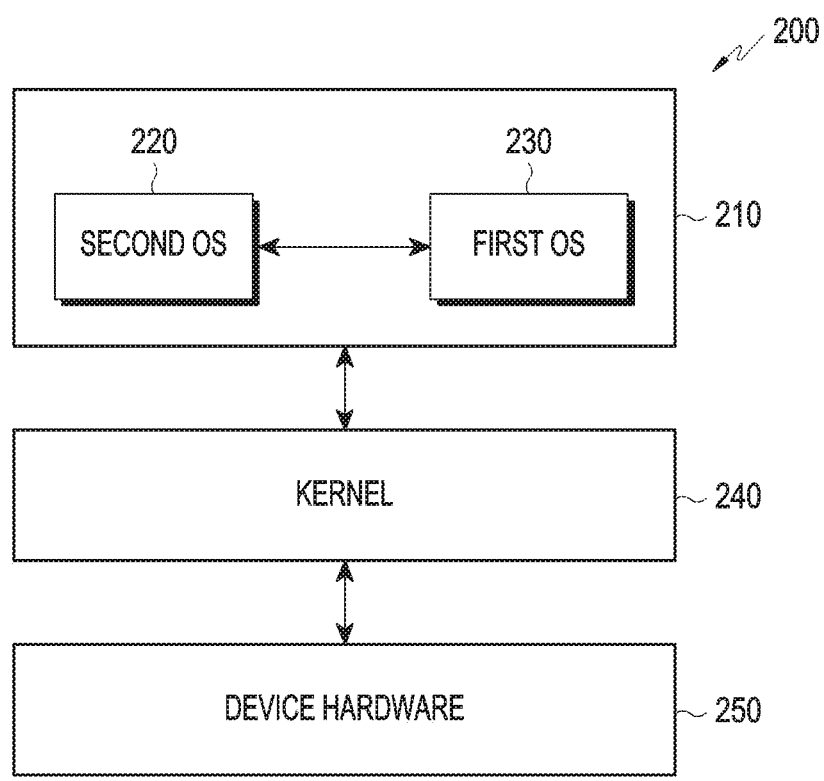
FIG. 2 is a view illustrating example components of an electronic device for controlling execution of heterogeneous operating system (OSs) according to an embodiment of the disclosure.

FIG. 2 is a view 200 illustrating example components of an electronic device for controlling execution of heterogeneous OSs according to an embodiment of the disclosure.

Referring to FIG. 2, the electronic device (e.g., the electronic device 101 of FIG. 1) may include OSs 210 and simultaneously execute a plurality of OSs. The OSs 210 may include a first OS 230 and a second OS 220. For example, the first OS 230 may be an Android OS in an embedded environment intended for use in the electronic device, and the second OS 220 may be a Linux OS. The second OS 220 may include Ubuntu® for a Linux-based OS. The first OS 230 may be referred to as a host OS, and the second OS 220 may be referred to as a guest OS.

The first OS 230 and the second OS 220 may operate independently from each other and co-exist and, when operated based on Linux, they may be dependent upon each other. The first OS 230 and second OS 220 of the OSs 210 may communicate with the kernel 240 and may communicate with each other as indicated with the arrow. According to an embodiment, although Android and Linux are taken as examples of OSs which may belong to the OSs 210, other various types of OSs than Android and Linux may be added or used instead. Thus, the OSs 210 may include two or more, various types of OSs, and the plurality of OSs may exist independently on the same kernel 240 (or different cores/kernels).

The kernel 240 may allocate each resource of the electronic device by connecting and managing interactions between individual middleware units of the first OS 230 and the second OS 220 of the OSs 210 and the physical components of device hardware 250.

The device hardware 250 may include various hardware devices. The device hardware 250 may be devices coupled with a processor (e.g., the processor 120 of FIG. 1) configured to perform various functions and computational operations. For example, the device hardware 250 may include a memory coupled with the processor (e.g., the processor 120 of FIG. 1). The memory (e.g., the memory 130 of FIG. 1) may store instructions computer-executable to perform various functions and operations to control execution of heterogeneous OSs.

Figure 3:
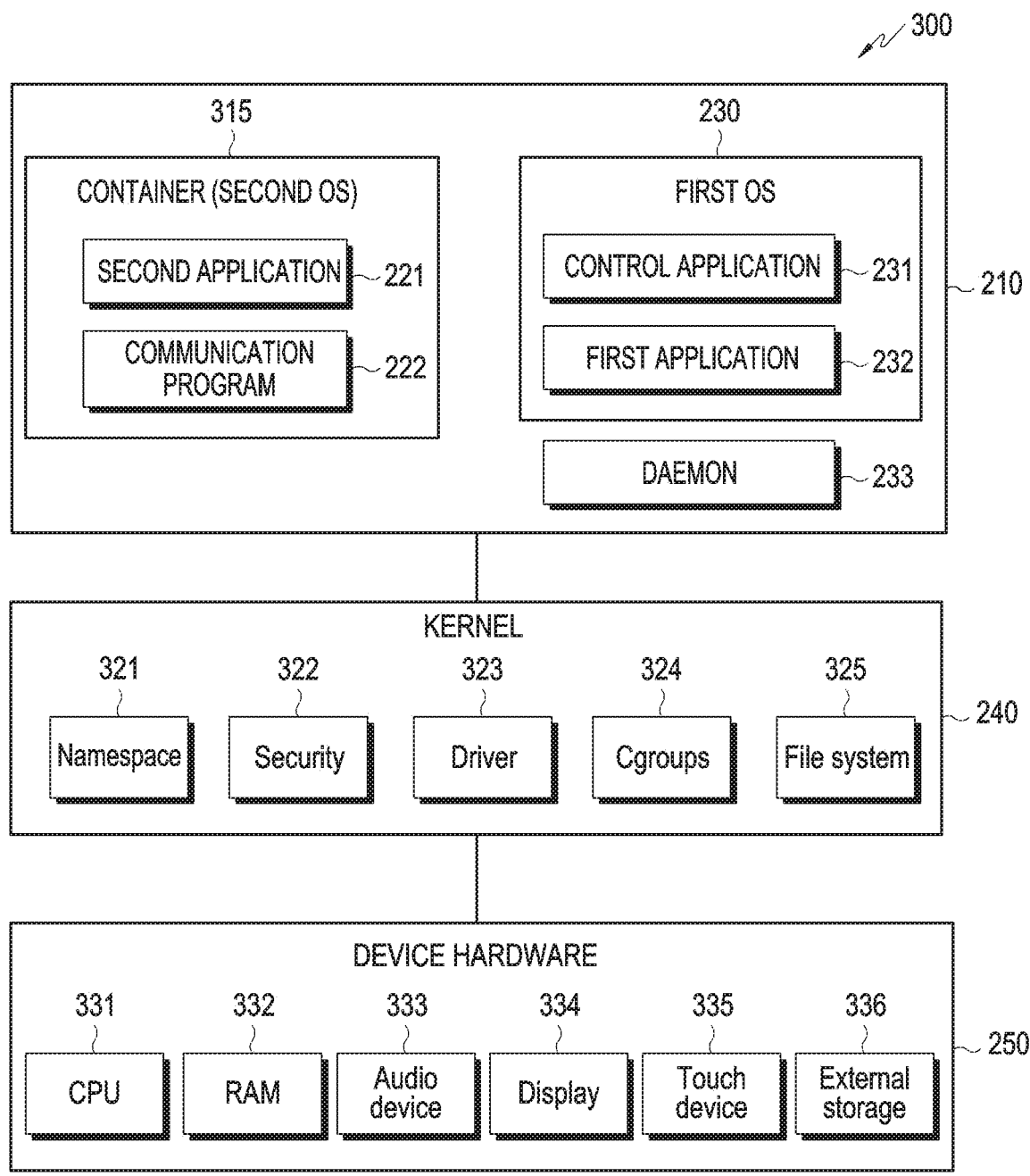
FIG. 3 is a view illustrating example detailed components of an electronic device for controlling execution of heterogeneous OSs according to an embodiment of the disclosure.

FIG. 3 is a view 300 illustrating example detailed components of an electronic device for controlling execution of heterogeneous OSs according to an embodiment of the disclosure. The detailed components of FIG. 3 may correspond to the components of FIG. 2 but, without limitations to the components of FIG. 3 may add other various functions and components.

Referring to FIG. 3, an electronic device (e.g., the electronic device 101 of FIG. 1) may include OSs 210 including a plurality of OSs, a kernel 240, and device hardware 250. The OSs 210 may include a plurality of heterogeneous OSs, e.g., a first OS 230 and a second OS 220 as shown in FIG. 2.

According to an embodiment, the first OS 230 may be an Android-based OS and may include a control application 231 and a first application 232. The first application 232 may be at least one application operable on an Android OS and may be referred to as an application program. For example, the first application 232 may correspond to various applications operable based on an Android OS, such as a video playback application or a web browser application.

The first OS 230 may be a main OS which operates when the electronic device boots up and may be referred to as a host OS. The first OS 230 may execute the control application 231 for interaction with one or more different OSs, e.g., guest OSs, and managing system resources.

According to an embodiment, the first OS 230 may include the control application 231 for processing and controlling data based on the first OS 230 and data based on an OS (e.g., the second OS 220 of FIG. 2) different from the first OS 230. For example, when the first OS 230 is an Android OS, and the second OS 220 is a Linux OS, the control application 231 may process and control Android OS-based data and Linux-based data.

According to an embodiment, the control application 231 may communicate with the running process of the guest OS (e.g., the second OS 220 of FIG. 2) through a container 315 using the kernel 240 of the first OS 230. The control application 231 may transfer an event occurring in the process of the guest OS to the process of the first OS 230 (e.g., an Android OS) or transfer an event occurring in the process of the first OS 230 to the guest OS to execute or control the process. According to an embodiment, the control application 231 may be referred to as a Linux on dex (LoD) application.

According to an embodiment, the guest OS (e.g., the second OS 220 of FIG. 2) may be executed through the container 315 and may include a plurality of applications (e.g., the second application 221) operable on the guest OS. The guest OS executed through the container 315 may include at least one communication program 222. The communication program 222 may be a component for communication with the first OS 230 and may communicate with the control application 231. For example, the communication program 222 may transmit data related to the guest OS executed on the container 315 via socket communication to the control application 231 of the outside (e.g., the first OS 230) of the container. Thus, the first OS 230 may obtain data related to the guest OS operated, isolated, using the container 315 from the communication program 222 and deal with the process related to the guest OS based on the obtained data related to the guest OS.

According to an embodiment, the OSs 210 or the first OS 230 may include a daemon 233 in the multitasking OS. According to an embodiment, the daemon 233 may be called a namespace tool (NST) daemon. The daemon 233 may be a program operating in the background of the electronic device for the control application 231. The daemon 233 may communicate with the control application 231 and may generate the container 315 for executing the guest OS and control various functions of the kernel 240, e.g., a namespace function 321 and a Cgroups 324, and support operation processes, such as mount control of the file system 325. The daemon 233 may also support the operation process of the guest OS without terminating the process of the host OS.

Although FIG. 3 illustrates an example in which the daemon 233 is included in the OSs 210 independently from the first OS 230 and the container 315 related to the second OS which is the guest OS, this is merely an example and embodiments of the disclosure are not limited thereto. For example, the daemon 233 uses the kernel 240 of the first OS 230 and may thus be positioned at the top of the kernel 240 in view of the software hierarchy, but is not limited to the position.

According to an embodiment, the electronic device may generate the container 315 to be able to simultaneously execute heterogeneous OSs. According to an embodiment, the container 315 may be generated by the control application 231. The processor (e.g., the processor 120 of FIG. 1) of the electronic device may control the first OS 230 to generate the container 315 and generate the container 315 for executing the guest OS through the control application 231 installed on the first OS 230. According to an embodiment, when a user selection for an application operable based on the second OS 220 is input, the container 315 may be generated corresponding to the input. For example, when the user selects an icon for executing the application of the second OS 220, the container 315 for executing the second OS 220 may be generated.

According to an embodiment, the electronic device may use a pre-existing (or pre-generated) container (not shown) to be able to simultaneously execute heterogeneous OSs. According to an embodiment, while there is at least one pre-existing container sharing the kernel 240, a particular one of at least one container in the first OS 230 may be allocated as a container for executing the second OS 220. The operation of allocating the particular container may control the processor (e.g., the processor 120 of FIG. 1) of the electronic device to allow the first OS 230 to allocate the particular container or control the allocation via the control application 231. As described above, when a particular container for executing the second OS 220 is allocated, data related to the second OS 220 may be isolated and operated using the particular container. For example, when the user selects an icon for executing the application of the second OS 220, any one of pre-existing containers may be designated for the purpose of executing the second OS 220.

According to an embodiment, the control application 231 may execute the second OS 220 through the container 315 (or the particular container). Thus, rather than previously allocating or storing and then managing all data necessary for the application operating based on the second OS 220 as well as data for driving the second OS 220, the electronic device may generate the container 315 corresponding to reception of a user input for driving the second OS 220 and then allocate data necessary for the second OS 220 to the generated container 315, thereby enabling simultaneous execution of heterogeneous OSs.

According to an embodiment, corresponding to a user input for selecting an application for execution by a second OS 220 (e.g., the second application 221), the control application 231 may allocate and provide data necessary for executing the second application 221 through the container 315.

According to an embodiment, the container 315 may be generated not by virtualization but by an isolation technique. For example, when the first OS 230 is running, only the process of the second OS 220 isolated may be processed without any booting process for executing the second OS 220. Thus, since images may be managed and distributed in file units through the container 315 by the control application 231 of the first OS 230, an OS different from the OS currently running may simultaneously be executed at the minimum capacity. Further, according to an embodiment, the container 315 may use the kernel 240 of the first OS 230 which is the host OS and allocate only memory necessary for the application executed based on the second OS 220, thus overcoming the limitations of virtual machines while being able to control heterogeneous OSs without overburdening the performance of the host OS.

According to an embodiment, the kernel 240 may be executed by the Linux kernel of the first OS 230 (e.g., an Android OS) and may generate the container 315 as a Linux container function to drive the guest OS (e.g., the Linux OS) by the control application 231. The kernel 240 may be a program providing various functions for executing the OS. For example, the kernel 240 may include at least one of a namespace function 321 to allocate a process for executing the guest OS related to the first OS 230 to the namespace, a security function 322, a driver function 323 to access the components of the device hardware 250 of the electronic device, a Cgroups function 324 to allocate resources to allocate the CPU core or memory capacity, or a file system function to store and manage files.

According to an embodiment, the container 315 may be an environment to drive a virtual OS independently from the first OS 230 and may be a distributed Linux version such as Ubuntu® or Debian created based on the Linux container-supporting kernel. Generation of the container 315 is not limited to by the components of FIG. 3 but may also be generated by a Linux namespace container.

According to an embodiment, the device hardware 250 may include at least one hardware component and may include a processor (e.g., a central processing unit 331) and a memory (e.g., a random-access memory 332). The device hardware 250 may further include various components and resources, such as an input device such as touch device 335, e.g., a keyboard, a mouse, and/or a touchscreen, an audio device 333, an output device, e.g., a speaker and/or a display 334, or an external storage device 336.

Figure 4:
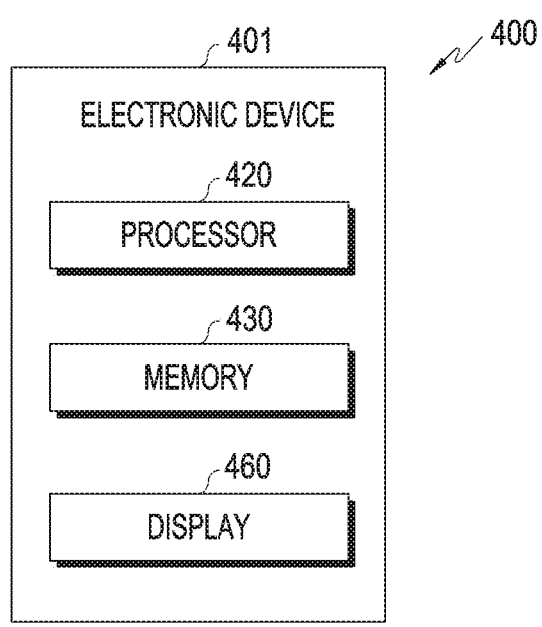
FIG. 4 is a view illustrating an internal structure of an electronic device for controlling execution of heterogeneous OSs according to an embodiment of the disclosure.

FIG. 4 is a block diagram 400 illustrating an internal configuration of an electronic device according to an embodiment of the disclosure.

Referring to FIG. 4, according to an embodiment, an electronic device 401 (e.g., the electronic device 101 of FIG. 1) may be a device (e.g., a smartphone or tablet personal computer (PC)) to control execution of heterogeneous OSs and may include at least one processor 420 (e.g., the processor 120 of FIG. 1), a memory 430 (e.g., the memory 130 of FIG. 1), and a display 460 (e.g., the display device 160 of FIG. 1). All of the components of FIG. 4 are not essential components of the electronic device 401 and the electronic device 401 may be implemented with more or less components than those shown in FIG. 4.

The memory 430 may store instructions to enable the processor 420 to perform various operations when executed.

According to an embodiment, the memory 430 may be operatively connected with the display 460 and the processor 420 and may store a plurality of applications including a first application operated based on a first OS and a second application operated based on a second OS.

According to an embodiment, the memory 430 may store instructions executed to enable the processor 420 to output a first object associated with execution of the first application and a second object associated with execution of the second application on a screen of the first OS and, when the second object among the first object and the second object is selected, output an execution screen of the second application on at least part of the screen of the first OS. The screen of the first OS may be a screen displayed while the first OS is running (or driven).

According to an embodiment, the instructions may be configured to enable the processor 420 to, while an external electronic device (e.g., an external display device) is connected with the electronic device, output the screen of the first OS to the external electronic device and, corresponding to selection of the second object, output the execution screen of the second application output on at least part of the screen of the first OS to the external electronic device.

According to an embodiment, the instructions may be configured to enable the processor 420 to, when the second object is selected, process data for executing the second application through the control application installed on the first OS. The control application may use a container for processing (or controlling) data for executing the second application. According to an embodiment, upon receiving a request for executing the second application, a new container may be generated or the existing container may be used corresponding to reception of the request.

According to an embodiment, the instructions may be configured to enable the processor 420 to, corresponding to selection of the second object, generate a container for executing the second OS through the control application installed on the first OS and output the execution screen of the second application while executing the second OS through the generated container.

According to an embodiment, the instructions may be configured to enable the processor 420 to, corresponding to selection of the second object, allocate any one of at least one container as a particular container for executing the second OS through the control application installed on the first OS and execute the second OS through the allocated particular container while outputting the execution screen of the second application.

According to an embodiment, the instructions may be configured to enable the processor 420 to output an object for executing the second OS on the screen of the first OS and, corresponding to selection of the object for executing the second OS, execute the second OS.

According to an embodiment, the instructions may be configured to enable the processor 420 to, when the first object among the first object and the second object is selected, execute the first application based on the first OS on the first OS and, when the second object is selected while the execution screen of the first application is output, output the execution screen of the second application to occupy the whole or part of the execution screen of the first application corresponding to selection of the second object.

According to an embodiment, the second application may be a package program distributed from the external server (e.g., an app store) to be executable on the second OS. According to an embodiment, the package program may include at least one of a package name for the second application, authority information, and target package information about the second OS necessary to execute the second application on the screen of the first OS. According to an embodiment, the execution screen of the second application is configured based on the target package information about the second OS.

According to an embodiment, the first OS may be an Android OS and the second OS may be a Linux OS.

Figure 5:
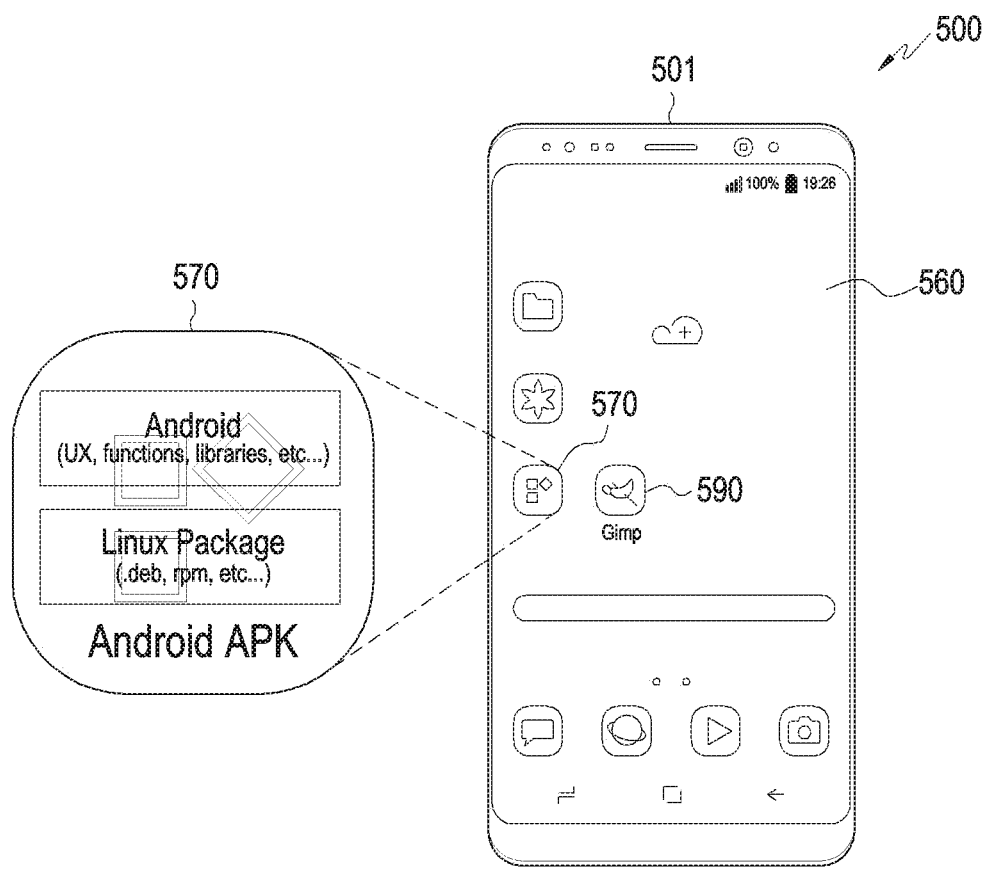
FIG. 5 is a view illustrating an example screen for controlling execution of heterogeneous OSs on an electronic device according to an embodiment of the disclosure.

FIG. 5 is a view 500 illustrating an example screen for controlling execution of heterogeneous OSs on an electronic device according to an embodiment of the disclosure.

Referring to FIG. 5, the electronic device 501 may output a screen of a first OS which may be a screen in the state of the first OS being executed (or driven). According to an embodiment, the screen of the first OS may be configured based on graphic data provided from the first OS. For example, a main home screen 560 as shown in FIG. 5 may be output on the screen of the first OS. When an object associated with the first application operable based on the first OS is selected, the screen of the first OS may include an execution screen of the first application. The execution screen of the first application may occupy the whole or part of the main home screen 560. The main home screen 560 may be the first screen displayed on the display (e.g., the display device 160 of FIG. 1 or the display 460 of FIG. 4) as the electronic device 501 powers on and the first OS runs. The main home screen 560 may include objects (e.g., icons) associated with the first application operable based on the first OS, an object 570 for driving a second OS different from the first OS running, and an object 590 associated with at least one second application operable based on the second OS. The object 570 for driving the second OS may be a shortcut icon for executing the application driven using the second OS. The object 570 for driving the second OS may be formed and displayed in the form of an icon which is formed of an image, text, photo, or a combination thereof.

According to an embodiment, at least one of the first application, the application for driving the second OS, or the second application may include applications stored in the electronic device 501 by the manufacturer of the electronic device 501. According to an embodiment, at least one of the application for driving the second OS and the second application may include applications downloaded from an external server (e.g., an app store) selling applications to the electronic device 501.

Corresponding to a user selection on the object 570 for driving the second OS, the electronic device 501 may drive the second OS. Corresponding to selection of the object 590 associated with at least one application operable based on the second OS, the electronic device 501 may obtain data necessary for the application related to the object 590 selected through the container 315 in the control application 231.

For example, when the user of the electronic device selects a Linux image, e.g., Ubuntu®, the screen of the Linux OS may be shown through the control application 231 of the Android OS.

Figure 6A:
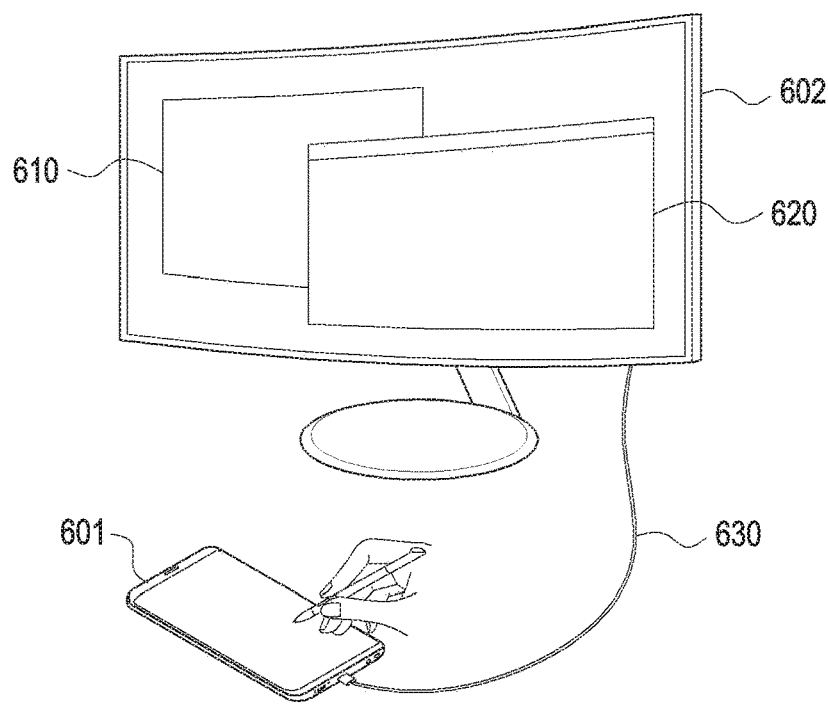
FIG. 6A is a view illustrating an operation environment of an electronic device according to an embodiment of the disclosure.
Figure 6B:
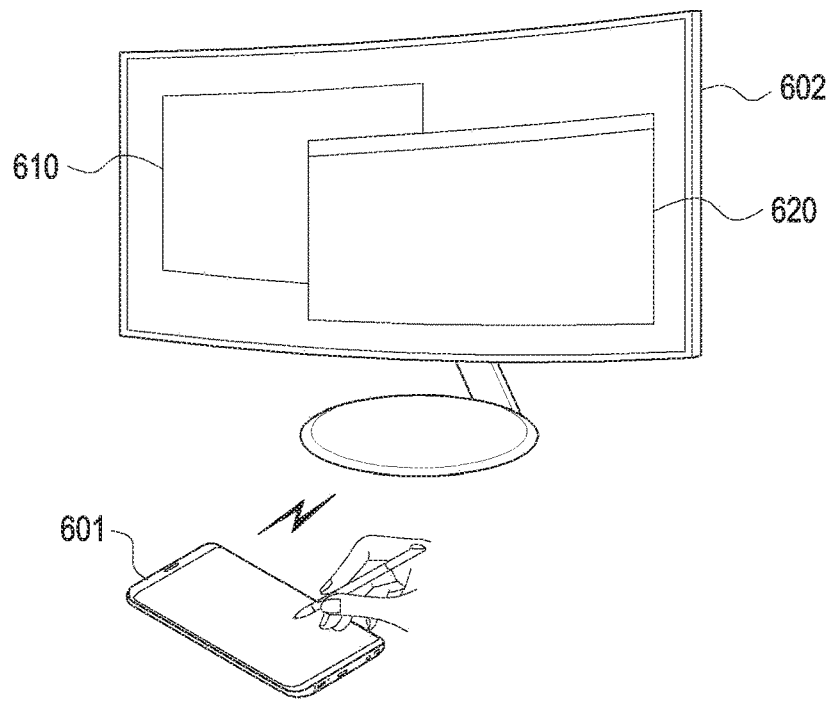
FIG. 6B is a view illustrating an operation environment of an electronic device according to an embodiment of the disclosure.

FIGS. 6A and 6B are views illustrating an operation environment of an electronic device according to various embodiments of the disclosure.

Referring to FIG. 6A, an electronic device 601 may be connected with an external electronic device (e.g., a display device) 602. Since the electronic device 601 is a mobile device, e.g., a smartphone, the size of the touchscreen display may be limited.

As shown in FIG. 6A, the electronic device 601 may be connected with an external electronic device 602 via, e.g., a USB connector, USB-C connector, or other input/output interface. Although FIG. 6A illustrates an example in which the electronic device 601 is connected with the external electronic device 602 through the input/output interface 630, embodiments of the disclosure are not limited thereto, and the electronic device 601 may be connected with the external electronic device 602 via a relay device, e.g., a docket station, and may wirelessly be connected with the external electronic device 602 as shown in FIG. 6B.

Referring to FIG. 6B, the electronic device 601 may be connected with the external electronic device 602 via a communication module (e.g., the communication module 190 of FIG. 1).

When the electronic device 601 is connected with the external electronic device 602, the electronic device 601 may output a screen through the external electronic device 602. The electronic device 601 may reconfigure the screen displayed on the display of the electronic device 601 and output the reconfigured screen through the external electronic device 602. The electronic device 601 may provide a similar user interface or user experience to that provided when a desktop computer is used to the user via the external electronic device 602.

According to an embodiment, the electronic device 601 may simultaneously execute a plurality of OSs and may simultaneously display the plurality of OSs on the screen. For example, the electronic device 601 may simultaneously execute an Android OS and a Linux OS and display a first window 610 and a second window 620 as shown in FIGS. 6A and 6B. The electronic device 601 may display the first window 610 and/or the second window 620 which occupies the whole or part of the screen output through the external electronic device 602 to display the execution screen of the application.

According to an embodiment, when the electronic device 601 is connected with the external electronic device 602, an operation (e.g., dex) for outputting data from the electronic device 601 through the screen of the external electronic device 602 may be automatically be executed. For example, when dex is automatically executed, a screen or mirroring screen with a similar layout to the desktop window may be displayed on the external electronic device 602.

According to an embodiment, when the electronic device 601 is connected to the external electronic device 602, the electronic device 601 may display an object for executing the second OS along with objects related to a plurality of applications including a first application operated based on the first OS and a second application operated based on the second OS on the external electronic device 602 in a similar manner to what is shown in FIG. 5.

The electronic device 601 may be wiredly or wirelessly connected with an external input device, e.g., a keyboard or mouse and may receive a user input through the external input device or receive a user input through the touchscreen display of the electronic device 601.

According to an embodiment, the external electronic device 602 may be various external devices connectable to the electronic device 601. For example, the external electronic device 602 may include a desktop computer, an external monitor, a television (TV), a laptop computer, or a personal computer.

Figure 7:
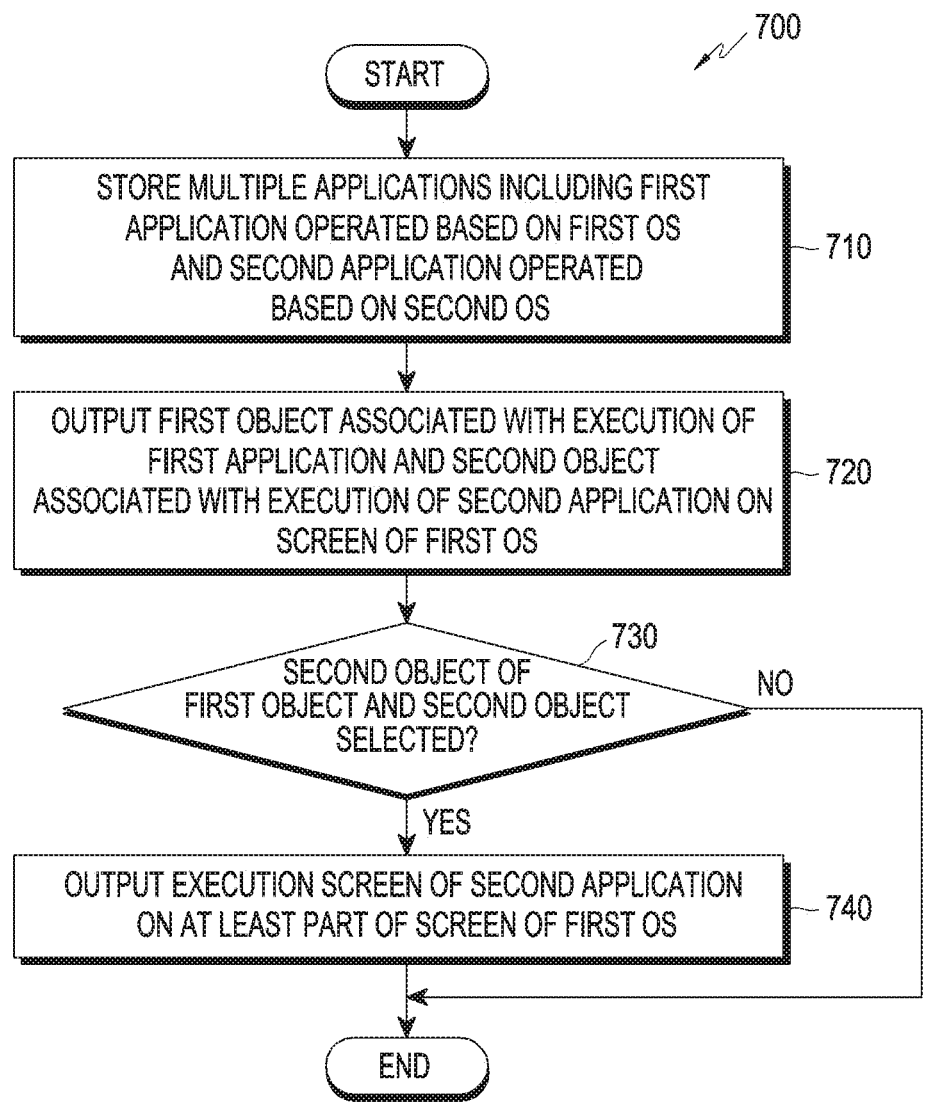
FIG. 7 is a flowchart illustrating operations of an electronic device for controlling execution of heterogeneous OSs according to an embodiment of the disclosure.

FIG. 7 is a flowchart 700 illustrating operations of an electronic device for controlling execution of heterogeneous OSs according to an embodiment of the disclosure. The operation method may include operations 710 to 740. Each step/operation of the operation method may be performed by at least one of an electronic device (e.g., the electronic device 101 or 401 of FIG. 1 or 4) or at least one processor (e.g., the processor 120 or 420 of FIG. 1 or 2) of the electronic device. According to an embodiment, at least one of operations 710 to 740 may be omitted or changed in order or may add other operations.

Referring to FIG. 7, the electronic device may include a plurality of applications including a first application operated based on a first OS and a second application operated based on a second OS in operation 710.

In operation 720, the electronic device may output a first object associated with execution of the first application and a second object associated with execution of the second application on a screen of the first OS. According to an embodiment, various applications driven depending on each OS may be downloaded from an external server (e.g., an app store) and pre-stored. Although FIG. 7 illustrates an example in which a second object associated with execution of the second application is displayed along with a first object, the second application may be an application installed in real-time by an application search process and a download process. According to an embodiment, the second application may be a type of package program distributed from the external server to be installed on the first OS-based electronic device while the first OS is running and to be executable on the second OS. For example, the package program may be an installation file for the second application and may include at least one of a package name for the second application, authority information, and target package information about the second OS necessary to execute the second application while the first OS is running.

In operation 730, the electronic device may determine whether the second object among the first object and the second object is selected. When the second object is selected, the electronic device may output the execution screen of the second application on at least part of the screen of the first OS in operation 740. According to an embodiment, although the second application is operated based on the second OS, the first OS may continuously operate in the background.

According to an embodiment, the operation of outputting the execution screen of the second application may include, while an external electronic device (e.g., an external display device) is connected with the electronic device, outputting the screen of the first OS to the external electronic device and, corresponding to selection of the second object, outputting the execution screen of the second application output on at least part of the screen of the first OS to the external electronic device.

According to an embodiment, the method may further include, when the second object is selected, processing data for executing the second application through the control application installed on the first OS. The control application may use a container for processing (or controlling) data for executing the second application. According to an embodiment, upon receiving a request for executing the second application, a new container may be generated or the existing container may be used corresponding to reception of the request.

According to an embodiment, the method may further include, corresponding to selection of the second object, generating a container for executing the second OS through the control application installed on the first OS and outputting the execution screen of the second application while executing the second OS through the generated container.

According to an embodiment, the method may further include outputting an object for executing the second OS on the screen of the first OS and, corresponding to selection of the object for executing the second OS, executing the second OS through the generated container.

According to an embodiment, the operation of outputting the execution screen of the second application may include, when the first object among the first object and the second object is selected, executing the first application based on the first OS on the first OS and, when the second object is selected while the execution screen of the first application is output, outputting the execution screen of the second application to occupy the whole or part of the execution screen of the first application corresponding to selection of the second object.

Thus, when the user selects the first application again while the execution screen of the second application is displayed, the execution screen of the first application may be output along with the execution screen of the second application. For example, it may be shown to the user as if the Linux package is executed directly on Android by clicking the Linux-related icon in the Android background. Therefore, the user may have the same user experience as when using an application running on Android by the Linux execution screen shown in the Android screen with a single click on the application which actually runs on Linux.

According to an embodiment, the second application may be a package program distributed from the external server to be executable on the second OS.

According to an embodiment, the package program may include at least one of a package name for the second application, authority information, and target package information about the second OS necessary to execute the second application on the screen of the first OS.

According to an embodiment, the execution screen of the second application is configured based on the target package information about the second OS.

As set forth above, according to an embodiment, it is possible to simultaneously access applications, which are based on different OSs, on the same screen, e.g., the screen of the host OS while providing easy access with a single click, thereby enhancing user convenience.

Figure 8:
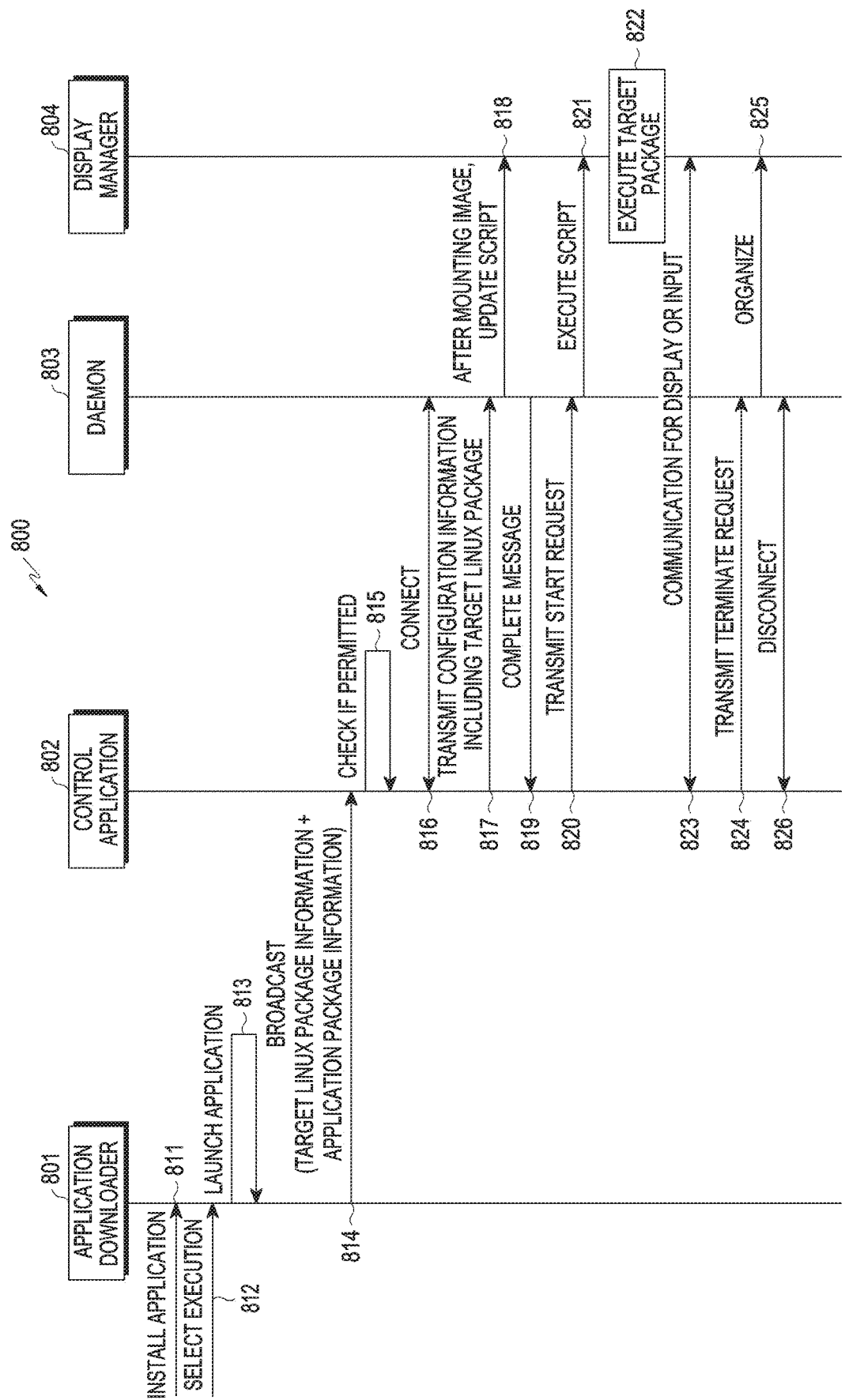
FIG. 8 is a flowchart illustrating obtaining a Linux package according to an embodiment of the disclosure.

FIG. 8 is a flowchart 800 illustrating obtaining a Linux package according to an embodiment of the disclosure. A process of obtaining a Linux package may include operations 811 to 826. According to an embodiment, at least one of operations 811 to 826 may be omitted or changed in order or may add other operations.

Referring to FIG. 8, an electronic device (e.g., the electronic device 101 of FIG. 1 or the electronic device 401 of FIG. 4) may download an application from an external server (e.g., an app store) and install the application in operation 811. Although FIG. 8 illustrates an example in which an application downloader 801 is a component for downloading applications, the operation may be performed by a processor (e.g., the processor 120 of FIG. 1 or the processor 420 of FIG. 2) or by components in charge of communication in each without being limited thereto. According to an embodiment, the downloaded application may be an application operated based on the guest OS. For example, when the guest OS is a Linux OS, the downloaded application may be called a Linux package application.

When the Linux package application is downloaded, a shortcut icon for executing a Linux-based application may be generated on the home screen of the electronic device.

According to an embodiment, the external server (e.g., an app store) may distribute all data necessary to execute the guest OS (e.g., the second OS 220) and the downloaded application in the form of a package program. Thus, when a user selection for executing the application corresponding to the generated shortcut icon is entered in operation 812, the electronic device may launch the downloaded application corresponding to the user selection in operation 813. In operation 814, the electronic device may broadcast application package information along with target Linux package information to the control application 802 installed on the running host OS (e.g., the first OS 230). According to an embodiment, the control application 802 may be an LoD application.

For example, the application may be a type of package program distributed from the external server to be installed on the host OS-based electronic device while the host OS is running and to be executable on the guest OS. For example, the package program may be an installation file for the application and may include at least one of a package name for the application, authority information, and target package information about the guest OS necessary to execute the application while the host OS is running. The Linux package application downloaded from the external server may have authority information for broadcasting to the control application 802.

The control application 802 of the electronic device may determine whether there is authority information based on package information about the downloaded application to be executable on the guest OS and identify whether to permit in operation 815. The authority information may be an authority to allow the guest OS to access the external electronic device or use the network.

The control application 802 of the electronic device may be executed when broadcast and may be connected with the daemon 803 using socket communication in operation 816. According to an embodiment, the daemon 803 may be called an NST daemon. For example, the daemon 803 may correspond to the daemon 233 of FIG. 3.

After connected with the daemon 803, the control application 802 of the electronic device may transmit configuration information containing the received target Linux package information, e.g., information such as a path of a file (e.g., "xenial.img"), to the daemon 803 in operation 817. The file "xenial.img" may be an image file in the Linux OS operated as the guest OS on the electronic device and may be an image of Ubuntu 16.04 version (i.e., xenial).

The daemon 803 may mount an image corresponding to the selected application through a display manager 804 using configuration information such as the xenial.img path and update the script (e.g., xstartup) of the mounted image with the target Linux package information in operation 818.

Upon receiving a complete message indicating completion of operations, such as script update from the daemon 803 in operation 819, the control application 802 may transmit a start request message to the daemon 803 in operation 820.

Upon receiving the start request message, the daemon 803 may execute the virtual network computing (VNC) server of the display manager 804 through the script in operation 821. The VNC server may execute the necessary target package (e.g., a Linux package) through the updated script information through a screen configuration process for executing applications in operation 822. In operation 823, the control application 802 may communicate with the VNC server for display or input. Accordingly, the user may execute his or her desired Linux package by a single icon click on the Android background screen. Thereafter, when the user terminates execution of the application, the control application 802 may correspondingly transmit a terminate request to the daemon 803 in operation 824. When the control application 802 is terminated, the daemon 803 may send a termination request to the VNC server of the display manager 804 and, in operation 825, may perform organization to unmount the image. Thus, in operation 826, the connection between the control application 802 and the daemon 803 may be released.

The process of downloading and executing a Linux-based application has been described above and, in a case where, e.g., the control application 802 among the components necessary to perform the operation is not installed on the electronic device, the control application 802 may be downloaded from the external server.

Figure 9:
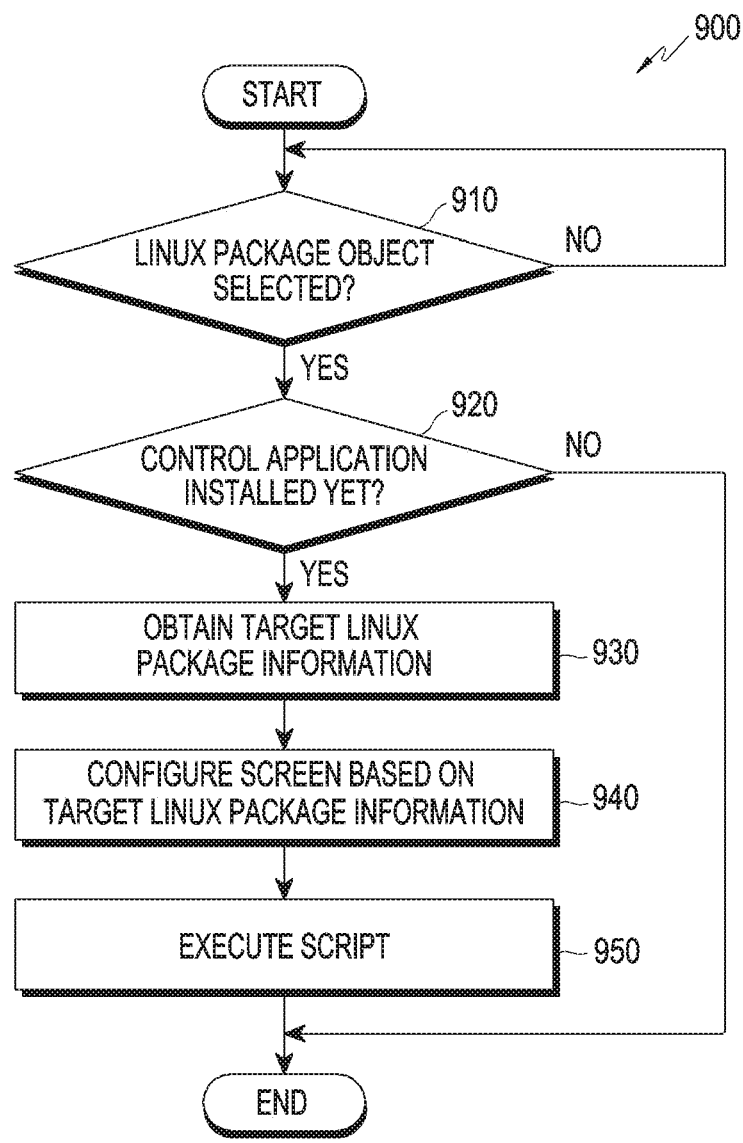
FIG. 9 is a flowchart illustrating operations of an electronic device for executing Linux according to an embodiment of the disclosure.

FIG. 9 is a flowchart 900 illustrating operations of an electronic device for executing Linux according to an embodiment of the disclosure.

FIG. 9 illustrates an example preparation operation before executing Linux and the operation method may include operations 910 to 950. Each step/operation of the operation method may be performed by at least one of an electronic device (e.g., the electronic device 101 or 401 of FIG. 1 or 4) or at least one processor (e.g., the processor 120 or 420 of FIG. 1 or 2) of the electronic device. According to an embodiment, at least one of operations 910 to 950 may be omitted or changed in order or may add other operations.

Referring to FIG. 9, an electronic device may determine whether a Linux package object is selected in operation 910. For example, the Linux package object may be an icon indicating the downloaded application. When the Linux package object is selected, it may be determined whether a control application has been installed in the Android OS for performing control and communication with the Linux OS in operation 920. When no control application has been installed yet, it may be downloaded from the external server.

When there is a control application installed, the electronic device may launch the downloaded application to obtain target Linux package information in operation 930. For example, the control application (e.g., the control application 231 of FIG. 3 or the control application 802 of FIG. 8) of the electronic device may receive target Linux package information corresponding to the Linux package icon clicked by the user. Thereafter, the electronic device may configure a screen based on the target Linux package information in operation 940. For example, the electronic device may mount a xenial image based on the target Linux package information and update the script. Then, the electronic device may execute the VNC server to run the script in operation 950. Accordingly, an environment for executing the Linux package application based on the updated script information may be configured.

Figure 10:
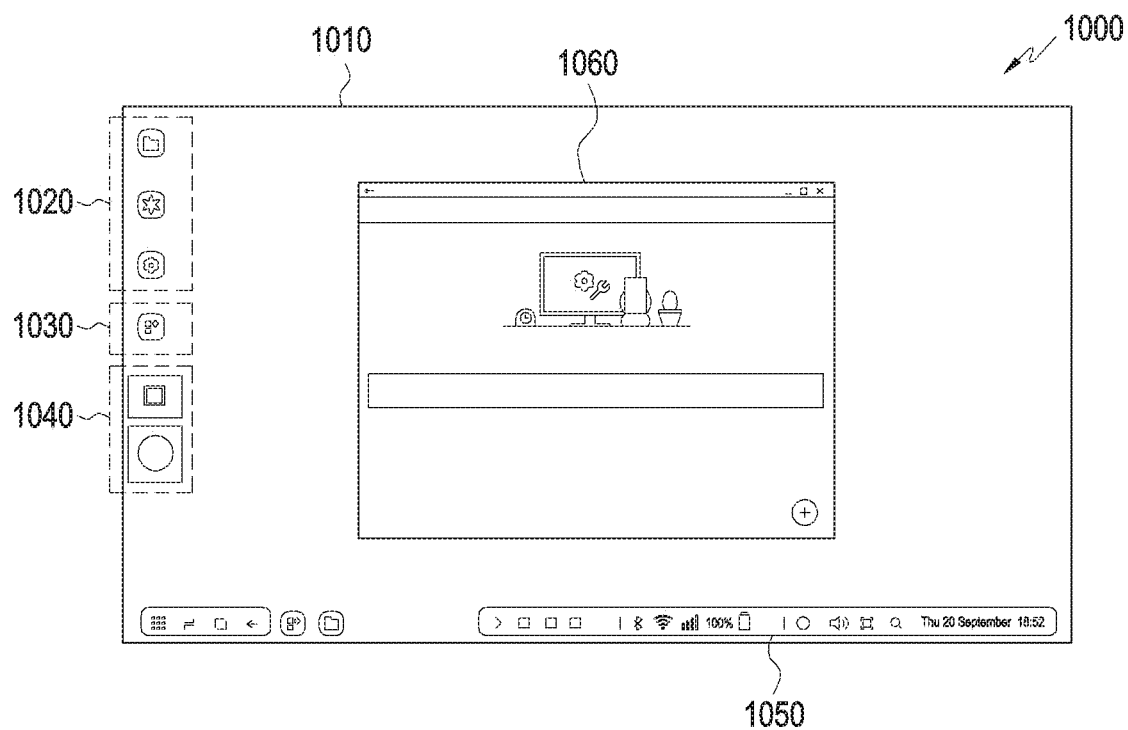
FIG. 10 is a view illustrating an example screen configuration for simultaneous execution of heterogeneous OSs according to an embodiment of the disclosure.

FIG. 10 is a view 1000 illustrating an example screen configuration for simultaneous execution of heterogeneous OSs according to an embodiment of the disclosure.

Referring to FIG. 10, a main screen 1010 is displayed on an external electronic device upon connecting an electronic device (e.g., the electronic device 101 of FIG. 1 or the electronic device 401 of FIG. 4) to the external electronic device (e.g., the external electronic device 602 of FIGS. 6A and 6B).

Referring to FIG. 10, when the electronic device detects a connection with the external electronic device (e.g., an external display device), the normal mode may switch into the expansion mode. According to an embodiment, the expansion mode may be a mode in which, e.g., a dex program, is executed and may mean a mode in which the screen is displayed on the external electronic device or the displays of the electronic device and the external electronic device. According to an embodiment, the normal mode may mean a mode in which as the external electronic device is not connected with the electronic device, the screen is displayed only on the display device (e.g., the display device 160 of FIG. 1 or the display 460 of FIG. 4) of the electronic device.

When the screen is displayed on the external electronic device, the main screen 1010 of the external electronic device may provide a similar layout to that of a desktop window, and displayed applications and system functions, settings, date, or time may be displayed in the task bar area 1050 at the bottom of the main screen 1010 like in the task bar of the window computer. For example, a web browsing window 1060 may be displayed through the main screen 1010 corresponding to a user input for executing a web browsing application. The user may execute all the applications installed on the electronic device by selecting an object indicating the application displayed on the main screen 1010. The running application and the running OS may be displayed in the form of icons in the task bar area 1050.

According to an embodiment, various objects, e.g., shortcut icons for executing applications available in the electronic device may be sorted and displayed on the main screen 1010. Although FIG. 10 illustrates an example layout constituted of a first area in which objects 1020 for executing applications operated based on a first OS are arranged and second areas in which objects 1040 for executing applications operated based on a second OS are arranged, the layout is not limited thereto. According to an embodiment, the main screen 1010 may further include a third area in which an object 1030 for entering into the second OS is disposed. According to an embodiment, the object 1030 for entry into the second OS may be an object for running the Linux OS.

According to an embodiment, upon receiving a user input for selecting at least one of objects 1040 for executing applications operated based on the second OS, an application operated on the second OS corresponding to the selected object may be executed while the second OS simultaneously runs. As such, the user may run the Linux OS and use Linux-based applications even with a single selection of an object for executing the Linux-based application without separate selection for entry into Linux.

According to an embodiment, corresponding to selection of an object for executing applications operated based on the second OS, the electronic device may generate a container (e.g., the container 315 of FIG. 3) and provide data necessary for executing the second OS to the control application 231 of the first OS 230 using the generated container. Thus, the electronic device may simultaneously output the execution screen of the application operated based on the second OS on the screen operated based on the first OS.

According to an embodiment, objects for executing the applications and the object for entry into the second OS may be arranged in the form of a matrix of columns and rows without differentiating between the OSs. Thus, the user need not distinguish between applications for Android and applications for Linux and may click and run Linux applications on the same screen as he or she does on Android applications.

Figure 11:
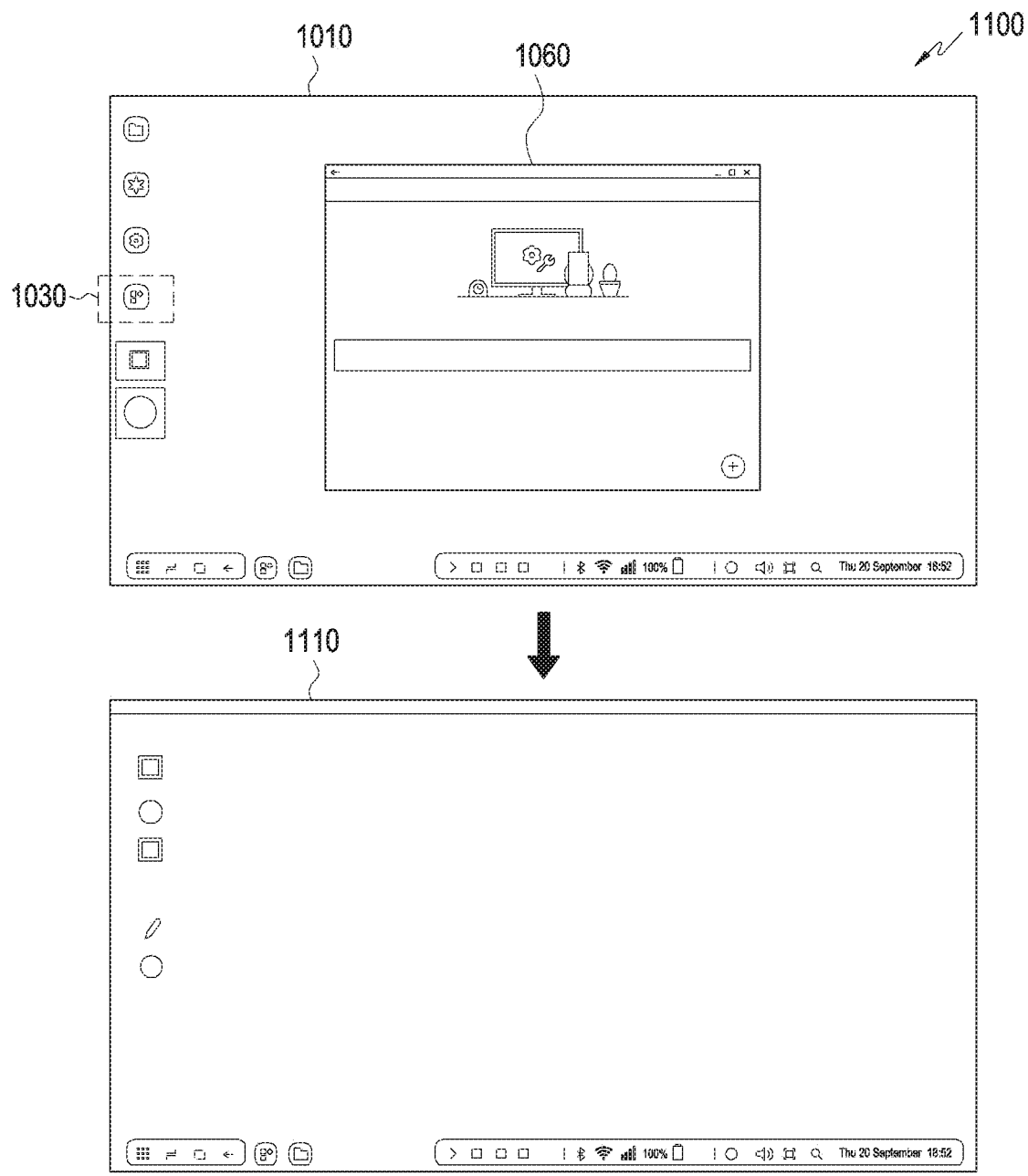
FIG. 11 is a view illustrating an example screen corresponding to selection of an object for executing a second OS according to an embodiment of the disclosure.

FIG. 11 is a view 1100 illustrating an example screen corresponding to selection of an object for executing a second OS according to an embodiment of the disclosure.

Referring to FIG. 11, it illustrates an example of displaying an object 1030 for entry into the second OS on the main screen 1010. According to an embodiment, the object 1030 for entry into the second OS may be an object for running the Linux OS. When the user selects the object 1030 for entry into the second OS, the execution screen 1110 of the Linux OS may be displayed. The execution screen 1110 of the Linux OS may be displayed to hide the whole or part of the main screen 1010.

Figure 12:
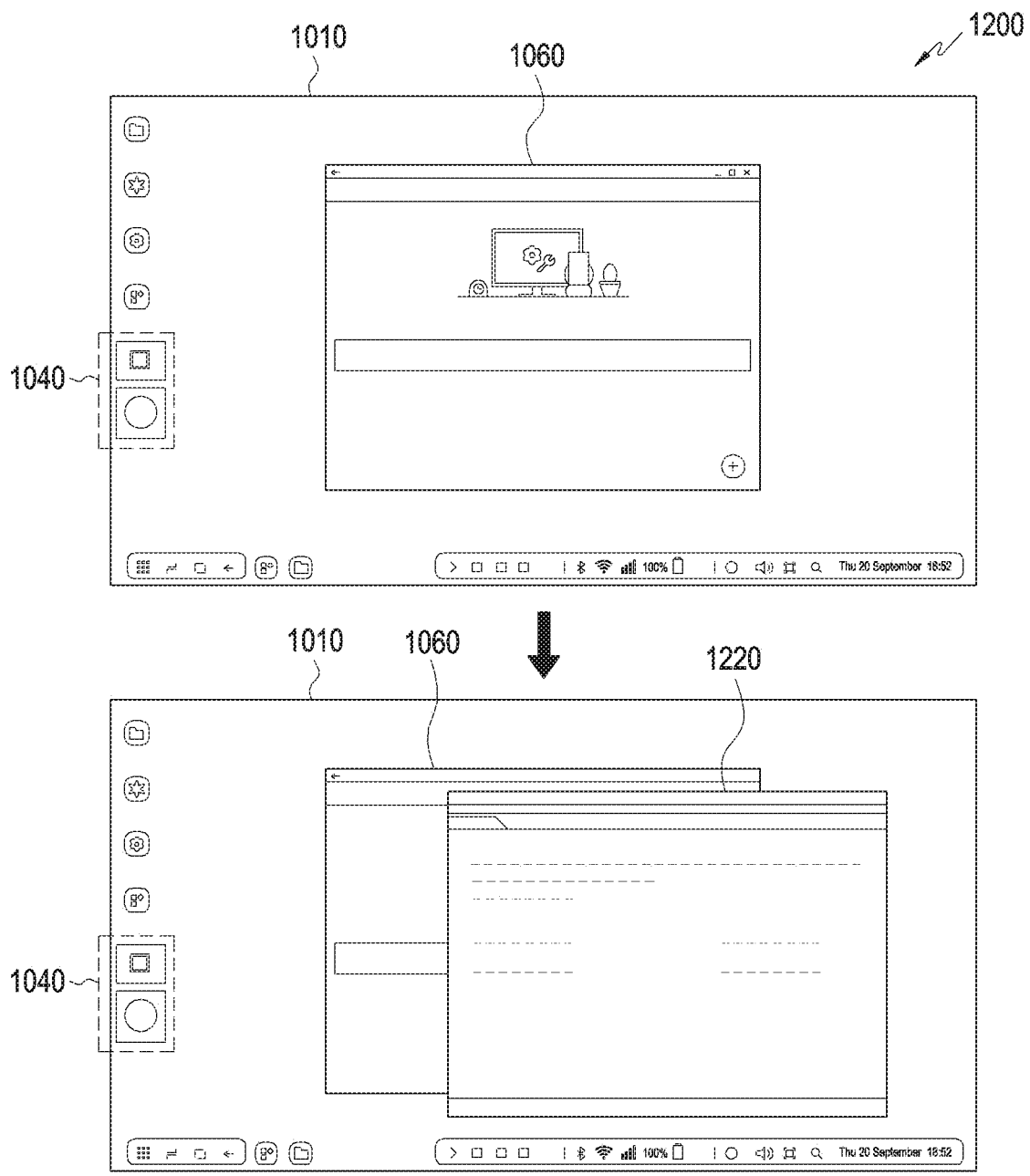
FIG. 12 is a view illustrating an example screen corresponding to selection of an object for executing a second application based on a second OS according to an embodiment of the disclosure.

FIG. 12 is a view 1200 illustrating an example screen corresponding to selection of an object for executing a second application based on a second OS according to an embodiment of the disclosure.

FIG. 12 illustrates an example of displaying objects 1040 for executing at least one application operable on the second OS on the main screen 1010. When the user selects any one of the objects 1040, the execution screen 1220 of the application operated based on the Linux OS may be displayed. According to an embodiment, when the execution screen 1060 of the Android-based application is being displayed, the application execution screen 1220 may be displayed to hide at least part of the Android-based application execution screen 1060. The application execution screen 1220 may be expanded to occupy the whole main screen 1010.

Referring to FIG. 12, it illustrates an example in which the Linux-based application execution screen 1220 along with the Android-based application execution screen 1060 is displayed on the main screen 1010 which is the Android execution screen. When the Linux-based application is executed, the main screen 1010 may be replaced with the Linux execution screen 1110 of FIG. 11 and the Linux-based application execution screen 1220 may then be displayed.

As such, although applications of different OSs are run, the execution screens of the applications may simultaneously be displayed on the main screen 1010 and, thus, applications running on Linux may be used like the applications are used in the Android environment. Thus, user convenience may be enhanced.

Figure 13:
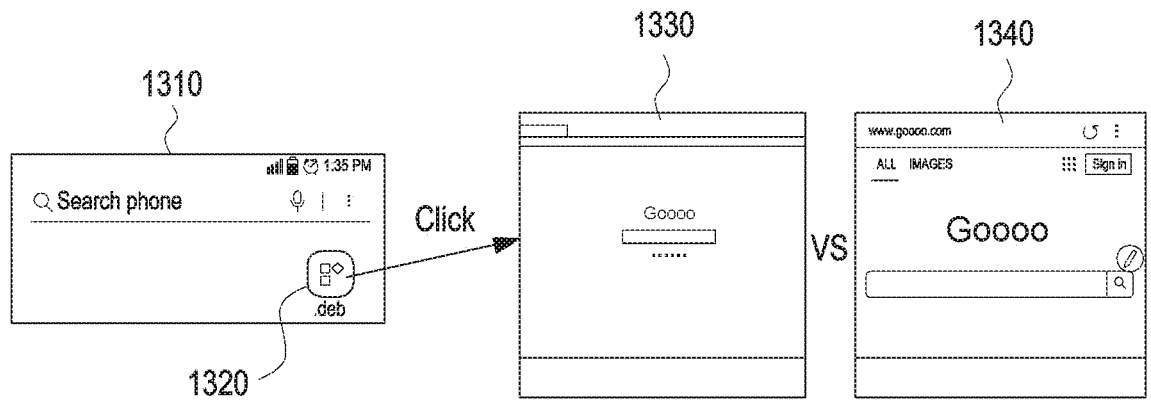
FIG. 13 is a view illustrating an example of comparing an execution screen of a first application operated based on a first OS and an execution screen of a second application operated based on a second OS according to an embodiment of the disclosure.

FIG. 13 is a view illustrating an example of comparing an execution screen of a first application operated based on a first OS and an execution screen of a second application operated based on a second OS according to an embodiment of the disclosure.

Referring to FIG. 13, when the user selects an icon (e.g., a Debian package (.deb)) 1320 on the background screen 1310 displayed on the electronic device, such a screen may be displayed as if a Linux package is executed on Android. For example, a first execution screen 1330 is an example screen of an application executed on the Linux OS and a second execution screen 1340 is an example screen of an application executed based on the Android OS. As shown in FIG. 13, when the user clicks on an icon (e.g., the Debian package (.deb)) 1320, the Debian package is able to provide an execution screen similar to the second execution screen 1340 albeit operating based on the Linux OS and, thus, the user may easily use applications of different OSs like when he or she uses Android applications.

FIGS. 14 to 19 are views 1400, 1500, 1600, 1700, 1800, and 1900 illustrating various example screens when heterogeneous OSs are simultaneously executed according to an embodiment.

Figure 14:
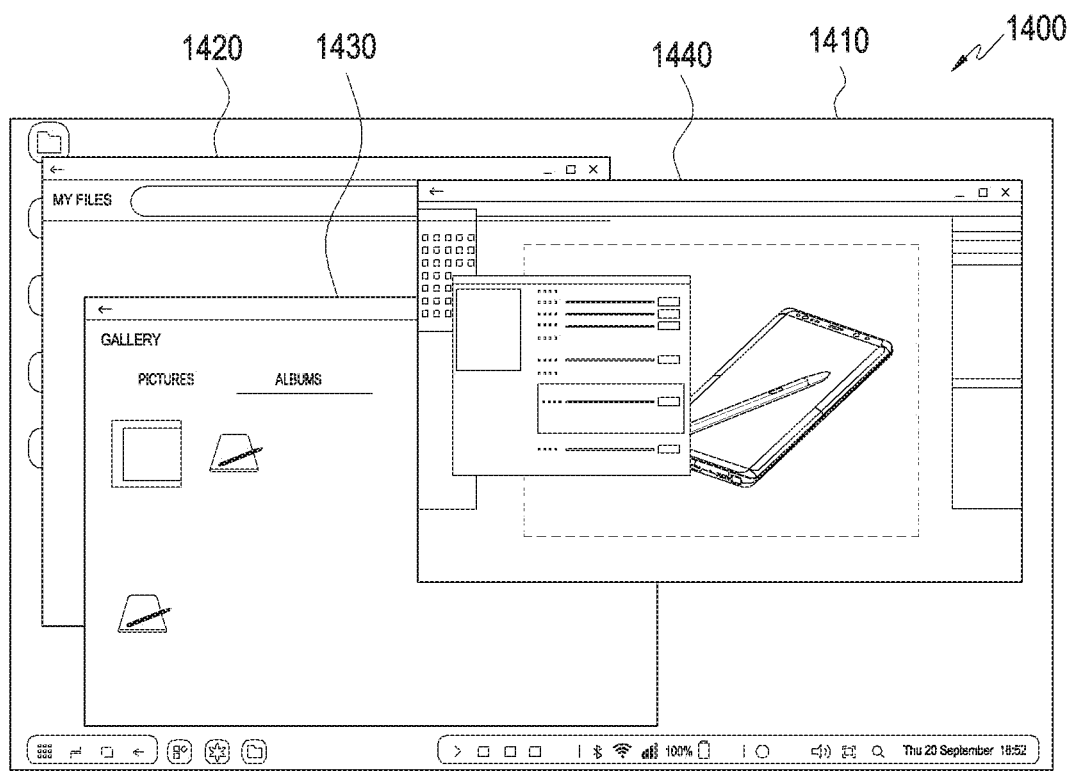
FIG. 14 is a view illustrating various example screens when heterogeneous OSs are simultaneously executed according to an embodiment of the disclosure.

FIG. 14 illustrates an example application execution screen based on different OSs displayed on an external electronic device connected with an electronic device.

Referring to FIG. 14, various application execution screens of a plurality of different OSs, such as a first window 1420, a second window 1430, and a third window 1440, may simultaneously be displayed on a main screen 1410. For example, an execution screen of a my files application of an Android OS, an execution screen of a Gallery application of the Android OS, and an execution screen of a Gimp application of a Linux OS may simultaneously be displayed in the first window 1420, the second window 1430, and the third window 1440, respectively.

Figure 15:
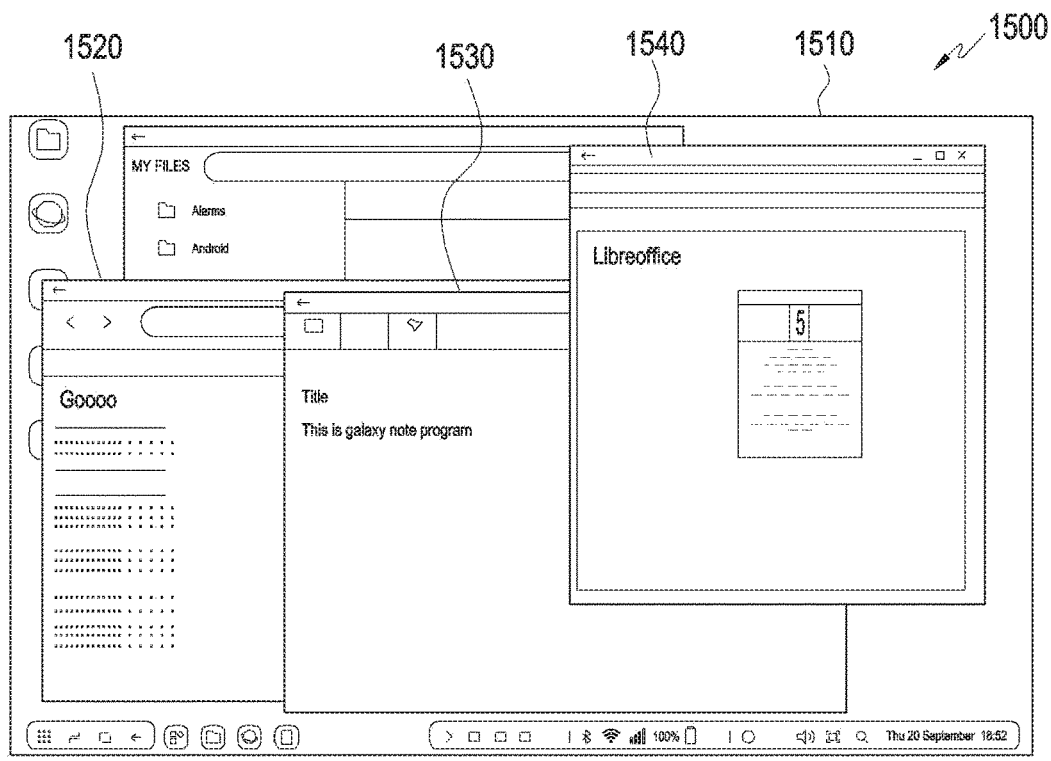
FIG. 15 is a view illustrating various example screens when heterogeneous OSs are simultaneously executed according to an embodiment of the disclosure.

Referring to FIG. 15, various application execution screens of a plurality of different OSs, such as a first window 1520, a second window 1530, and a third window 1540, may simultaneously be displayed on a main screen 1510. For example, an execution screen of an Internet application of an Android OS, an execution screen of a notepad application of the Android OS, and an execution screen of an office application (e.g., Libreoffice) of a Linux OS may simultaneously be displayed in the first window 1520, the second window 1530, and the third window 1540, respectively.

Figure 16:
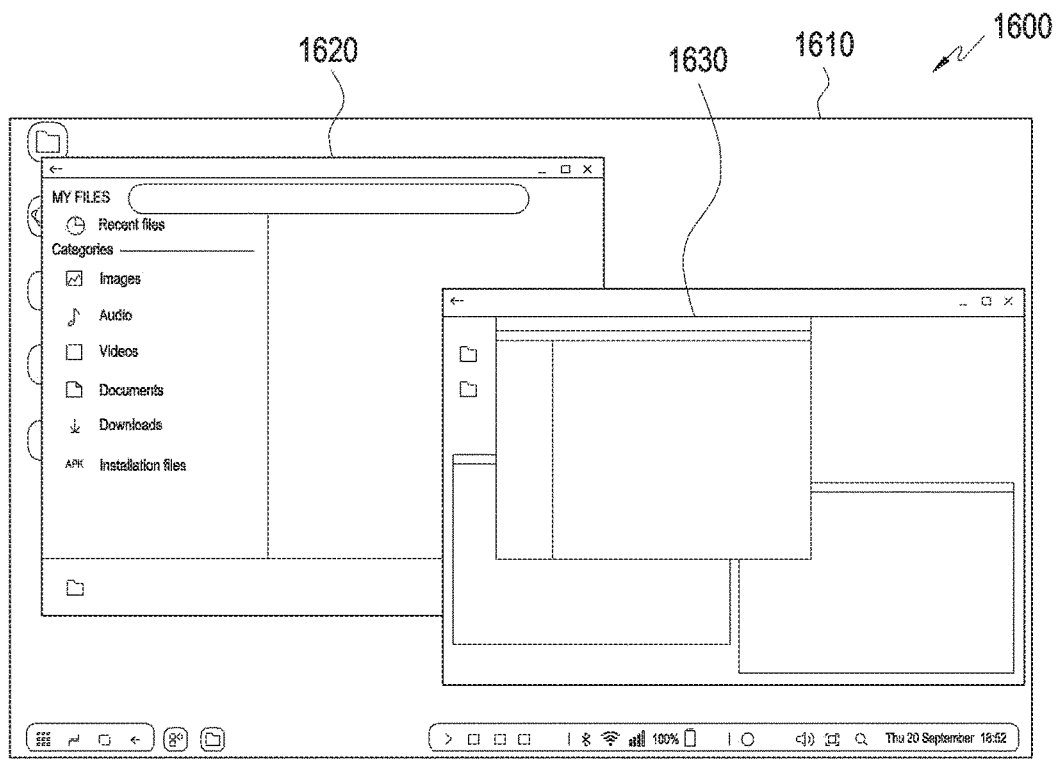
FIG. 16 is a view illustrating various example screens when heterogeneous OSs are simultaneously executed according to an embodiment of the disclosure.

Referring to FIG. 16, various application execution screens of a plurality of different OSs, such as a first window 1620 and a second window 1630, may simultaneously be displayed on a main screen 1610. For example, an execution screen of a shared folder application of an Android OS and an execution screen of a shared folder application of a Linux OS may simultaneously be displayed in the first window 1620 and the second window 1630, respectively.

Figure 17:
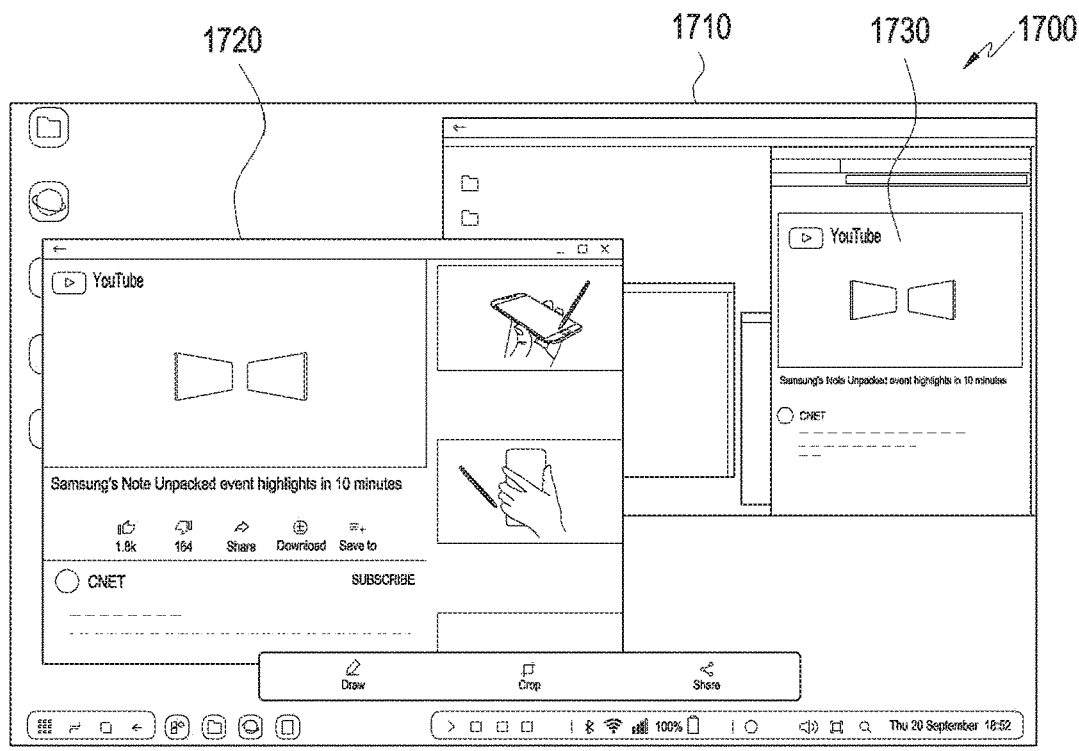
FIG. 17 is a view illustrating various example screens when heterogeneous OSs are simultaneously executed according to an embodiment of the disclosure.

Referring to FIG. 17, various application execution screens of a plurality of different OSs, such as a first window 1720 and a second window 1730, may simultaneously be displayed on a main screen 1710. For example, an execution screen of a video/audio application (e.g., YouTube) of an Android OS and an execution screen of a video/audio application of a Linux OS may simultaneously be displayed in the first window 1720 and the second window 1730, respectively.

Figure 18:
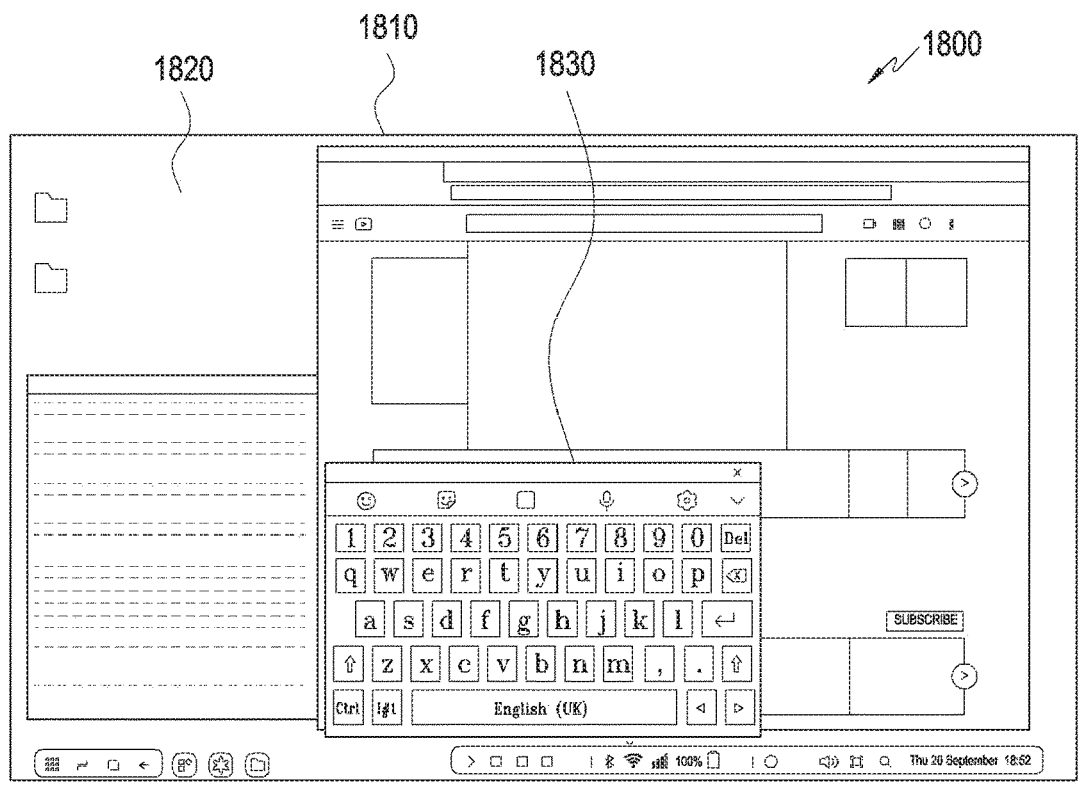
FIG. 18 is a view illustrating various example screens when heterogeneous OSs are simultaneously executed according to an embodiment of the disclosure.

Referring to FIG. 18, various application execution screens of a plurality of different OSs, such as a first window 1820 and a second window 1830, may simultaneously be displayed on a main screen 1810. For example, an execution screen of the Linux OS may be displayed on the first window 1820 on the full screen as shown in FIG. 18. Upon clicking on an input window in the Linux OS, an Android-based keyboard may be displayed in the second window 1830.

Figure 19:
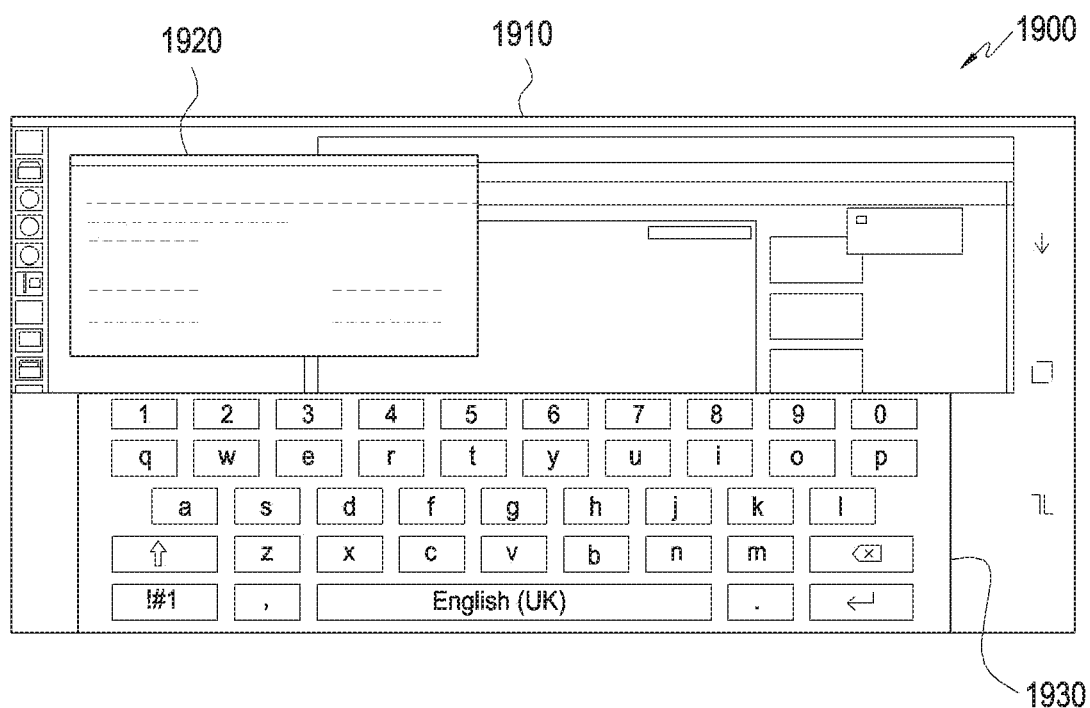
FIG. 19 is a view illustrating various example screens when heterogeneous OSs are simultaneously executed according to an embodiment of the disclosure.

Although FIG. 18 illustrates an example in which a keyboard is displayed in small size on at least part of the first window 1820 and the second window 1830 with the first window 1820, which displays the execution screen of the Linux OS, displayed on the entire screen, an Android-based keyboard 1930 may be displayed in larger size when the input window is clicked with the first window 1920, which is the execution screen of the Linux OS, displayed on the main screen 1910 as shown in FIG. 19.

As described above, according to various embodiments of the disclosure, the user may use Linux applications on Android via a screen for selecting various applications operable on the guest OS on the host OS-based screen and may thus use Linux applications in the same user experience as that of the Android environment. Thus, more user convenience may be achieved.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there is provided a storage medium storing commands configured to be executed by at least one processor to enable the at least one processor to perform at least one operation comprising outputting a first object associated with execution of a first application operated based on a first OS and a second object associated with execution of a second application operated based on a second OS on a screen of the first OS, receiving a selection of the second object among the first object and the second object, and corresponding to the selection of the second object, outputting an execution screen of the second application on at least part of the screen of the first OS.

As is apparent from the foregoing description, various embodiments of the disclosure may provide interworking between heterogeneous OSs in using or manipulating applications on the heterogeneous OSs, thereby expanding usability of smartphones not only for their own functionality but also for other various purposes.

Various embodiments of the disclosure may build up an environment in which applications based on different OSs may simultaneously be run on an electronic device (e.g., a smartphone), thus leading to more use convenience.

Various embodiments of the disclosure enable Linux applications to be run based on Android on an electronic device (e.g., a smartphone) in the same user experience given for the Android environment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
at least one processor; and
a memory operatively connected with the display and the at least one processor and configured to store a plurality of applications including a first application configured to execute using a first operating system (OS), a second application configured to execute using a second OS, and a control application installed on the first OS and configured to process first OS based data and second OS based data via a container using a kernel of the first OS,
wherein the memory stores instructions configured to, when executed, cause the at least one processor to:
display a first object and a second object on a screen of the first OS, wherein the first object is associated with execution of the first application and the second object is associated with execution of the second application,
receive a selection of the second object,
in response to receiving the selection of the second object, generate a container for executing the second OS based on configuration information transmitted by the control application installed on the first OS,
allocate data associated with the second OS to the generated container, and
in response to the second object being selected, execute the second OS using the generated container and display an execution screen of the second application on the screen of the first OS while executing the second OS using the generated container via the control application installed on the first OS.

2. The electronic device of claim 1, wherein the instructions are further configured to cause the at least one processor to:
display the screen of the first OS to an external electronic device while the electronic device is connected with the external electronic device, and
in response to a selection of the second object, display the execution screen of the second application to the external electronic device.

3. The electronic device of claim 1, wherein the instructions are further configured to cause the at least one processor to:
display a third object for executing the second OS on the screen of the first OS, and
in response to a selection of the third object, execute the second OS using the container.

4. The electronic device of claim 1, wherein the instructions are further configured to cause the at least one processor to:
in response to the selection of the second object, allocate a specific container for executing the second OS using the control application installed on the first OS, and
display the execution screen of the second application while executing the second OS using the specific container.

5. The electronic device of claim 1, wherein the instructions are further configured to cause the at least one processor to:
when the first object is selected, execute the first application based on the first OS on the screen of the first OS, and
when the second object is selected while an execution screen of the first application is displayed, display the execution screen of the second application to occupy a whole or at least part of the execution screen of the first application.

6. The electronic device of claim 1, wherein the second application corresponds to a package program distributed from an external server to be executed on the second OS.

7. The electronic device of claim 6, wherein the package program includes at least one of a package name for the second application, authority information, or target package information of the second OS necessary to execute the second application using the first OS.

8. The electronic device of claim 7, wherein the execution screen of the second application is configured based on the target package information of the second OS.

9. The electronic device of claim 1, wherein the first OS is an Android OS, and the second OS is a Linux OS.

10. A method for controlling execution in an electronic device, the method comprising:
displaying a first object and a second object on a screen of a first operating system (OS), wherein the first object is associated with execution of a first application using a first OS and a second object is associated with execution of a second application using a second OS;
receiving a selection of the second object;
in response to receiving the selection of the second object, generating a container for executing the second OS based on configuration information transmitted by a control application installed on the first OS;
allocating data associated with the second OS to the generated container; and
in response to the selection of the second object, executing the second OS using the generated container and displaying an execution screen of the second application on the screen of the first OS while executing the second OS using the generated container via the control application installed on the first OS and configured to process first OS based data and second OS based data via a container using a kernel of the first OS.

11. The method of claim 10, further comprising:
displaying the screen of the first OS to an external electronic device while the electronic device is connected with the external electronic device; and
in response to the selection of the second object, displaying the execution screen of the second application to the external electronic device.

12. The method of claim 10, further comprising:
displaying a third object for executing the second OS on the screen of the first OS; and
in response to selection of the third object, executing the second OS using the container.

13. The method of claim 10, further comprising:
in response to the selection of the second object, allocating a specific container for executing the second OS using the control application installed on the first OS; and
displaying the execution screen of the second application while executing the second OS using the specific container.

14. The method of claim 10, wherein the displaying of the execution screen of the second application comprises:
when the first object is selected, executing the first application based on the first OS on the screen of the first OS; and
when the second object is selected while an execution screen of the first application is displayed, displaying the execution screen of the second application to occupy a whole or at least part of the execution screen of the first application.

15. The method of claim 10, wherein the second application corresponds to a package program distributed from an external server to be executed on the second OS.

16. The method of claim 15, wherein the package program includes at least one of a package name for the second application, authority information, or target package information of the second OS necessary to execute the second application using the first OS.

17. The method of claim 16, wherein the execution screen of the second application is configured based on the target package information of the second OS.

18. A non-transitory storage medium storing instructions, the instructions configured to be executed by at least one processor to cause the at least one processor to perform a plurality of operations, the plurality of operations comprising:
displaying a first object and a second object on a screen of a first operating system (OS), wherein the first object is associated with execution of a first application using a first OS and the second object is associated with execution of a second application using a second OS;
receiving a selection of the second object;
in response to receiving the selection of the second object, generating a container for executing the second OS based on configuration information transmitted by the control application installed on the first OS;
allocating data associated with the second OS to the generated container; and
in response to the selection of the second object, executing the second OS using the generated container and displaying an execution screen of the second application on the screen of the first OS while executing the second OS using the generated container via a control application installed on the first OS and configured to process first OS based data and second OS based data via a container using a kernel of the first OS.

* * * * *